United States Patent
Carmon et al.

(10) Patent No.: US 8,351,412 B2
(45) Date of Patent: *Jan. 8, 2013

(54) METHOD AND APPARATUS FOR BLIND TRANSPORT FORMAT DETECTION USING DISCONTINUOUS TRANSMISSION (DTX) DETECTION

(75) Inventors: Rafael Carmon, Rishon-Letziyon (IL); Tamir Scherzer, Hertzeliya (IL); Eyal Yair, Givt-Ela (IL)

(73) Assignee: Agere Systems LLC, Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/348,912

(22) Filed: Jan. 12, 2012

(65) Prior Publication Data

US 2012/0113853 A1    May 10, 2012

Related U.S. Application Data

(63) Continuation of application No. 11/444,135, filed on May 31, 2006, now Pat. No. 8,121,104.

(51) Int. Cl.
*H04B 7/216* (2006.01)

(52) U.S. Cl. ......... 370/342; 370/335; 370/311; 370/349

(58) Field of Classification Search .................. 370/335, 370/342, 253, 328, 310, 349, 311; 375/227, 375/224–225, 341, 262, 287, 368, 150; 714/758
See application file for complete search history.

(56) References Cited

U.S. PATENT DOCUMENTS

| | | |
|---|---|---|
| 2001/0040916 A1 | 11/2001 | Sato |
| 2002/0064140 A1* | 5/2002 | Numminen ................... 370/311 |
| 2003/0198253 A1 | 10/2003 | Ahmed |
| 2004/0091067 A1 | 5/2004 | Ammer et al. |
| 2005/0276248 A1 | 12/2005 | Butala et al. |

FOREIGN PATENT DOCUMENTS

| | | |
|---|---|---|
| EP | 1 432 165 A1 | 6/2004 |
| GB | 2 380 909 | 4/2003 |
| IE | 1 605 597 A1 | 12/2005 |

(Continued)

OTHER PUBLICATIONS

"ARIB STD-T63-25.212 V4.5.0 Multiplexing and Channel Coding (FDD) (Release 4)," 3rd Generation Partnership Project: Technical Specification Group Radio Access Network: Multiplexing and Channel Coding (FDD) (Release 4) (2002).

(Continued)

*Primary Examiner* — Lester Kincaid
*Assistant Examiner* — Daniel Lai
(74) *Attorney, Agent, or Firm* — Ryan, Mason & Lewis, LLP

(57) ABSTRACT

Methods and apparatus are provided for blind transport format detection using Discontinuous Transmission (DTX) detection. According to one aspect of the invention, the transport format that was used to transmit information is determined by identifying a transition between a Discontinuous Transmission segment and a data segment included in the transmitted information; and determining the transport format based on a location of the transition of the Discontinuous Transmission segment. A cyclic redundancy check can optionally be performed for a plurality of possible transport formats, and then the step of identifying a transition can be limited to those transport formats having a valid cyclic redundancy check.

17 Claims, 3 Drawing Sheets

FOREIGN PATENT DOCUMENTS

WO    WO 2005/107097 A1    11/2005

OTHER PUBLICATIONS

"3rd Generation Partnership Project: Technical Specification Group Radio Access Network: Multiplexing and Channel Coding (FDD) (Release 4)," 3GPP TS 34.121 v4.1.0 (2003).

"Universal Mobile Telecommunications System (UMTS)," ETSI Standards, European Telecommunications Standards Institute, vol. 3-R1, No. V700 (Mar. 2006).

Adi et al., "Variable Redundancy Coding for Mobile Channels," Computers and Comunications Proceedings, Sixth IEEE Symposium, pp. 580-584 (Jul. 3-5, 2001).

\* cited by examiner

FIG. 2

For each frame in a TTI of the processed TrCH:
210 — Attain base address of frame in designated TrCH memory segment: $A_B$
220 — Sort all N transport formats with valid CRCs in descending order, such that:
maximum size TF index = 0
$\vdots$
minimum size TF index = N − 1
230 — For each transport format index, $i$, with a valid CRC, attain start of DTX address: $A_{DTX}(i)$
240 — If p-bits present, update base address: $A_B = A_B$ + number of p-bits
250 — Divide into memory sub-segments:
$Seg(0) = A_{DTX}(1) \ldots A_{DTX}(0)$
$\vdots$
$Seg(N-2) = A_{DTX}(N-1) \ldots A_{DTX}(N-2)$
260 — Define reference segment:
$Seg(ref) = A_B \ldots A_{DTX}(N-1)$
270 — Sum energy for reference segment:

$$E_{ref} = \frac{1}{length(Seg(ref))} \sum_{(Seg(ref))} soft\_bit^2$$

where p-bits are excluded from the integration if such bits appear in the integration window.
280 — Search for non-DTX energy using threshold, $D$:
for $i = 0$ to $N-2$ $$E = \frac{1}{length(Seg(i))} \sum_{(Seg(i))} soft\_bit^2 \text{ (excluding p-bits if present)}$$

$n = i$
if $E/E_{ref} > D$, break
if $n = N - 2$, $n = n + 1$
end
290 — Select transport format with index $n$

METHOD AND APPARATUS FOR BLIND TRANSPORT FORMAT DETECTION USING DISCONTINUOUS TRANSMISSION (DTX) DETECTION

CROSS-REFERENCE TO RELATED APPLICATIONS

This application is a continuation of U.S. patent application Ser. No. 11/444,135, filed May 31, 2006, incorporated by reference herein.

FIELD OF THE INVENTION

The present invention is related to communication techniques and, more particularly, to techniques for detecting a transport format in a communication system.

BACKGROUND OF THE INVENTION

A communication network transfers information, such as voice, video and telemetry, among the User Equipment (UE) of subscribers. Information, such as broadband Internet data, broadcast services, and network control data, can be transferred between the network itself and the subscriber UEs. A number of existing networks, such as Wideband Code Division Multiple Access (WCDMA), Code Division Multiple Access (3rd Generation cellular/radio technology) (CDMA2000), and Worldwide Interoperability for Microwave Access, Inc. (WiMAX), according to the IEEE 802.16 wireless broadband standard, support parallel operation of a plurality of such information services. For such support, and for optimization of the network capacity, these networks must be able to transfer information at rapidly changing data rates. The networks must also be able to combine the different services into a single physical data stream, used to transfer the combined information over the physical channel.

The Transport Layer typically combines data of different rates. The combination of information services and data rates changes rapidly. Thus, the transmitter must notify the receiver of the change at high rates. Most systems attach an additional header to transmitted data, describing the service combination format and data rates of the currently transferred data. This addition, naturally, increases the overhead.

In WCDMA (UMTS), for example, each service is related to a transport channel (TrCH). The service combination and data rate selection format used to combine the TrCHs into a physical data stream coded composite transport channel (CCTrCH), is referred to as a transport format combination (TFC). A transport format combination indicator (TFCI) is attached to each frame of data to indicate which the TFC that was selected. The receiver uses the TFCI to select the format for the decoding and separation of data into the different services. This process is referred to as TFCI signaling.

A number of techniques have been proposed or suggested for conserving the bandwidth required for TFCI signaling. For example, a Blind Transport Format Detection (BTFD) method was introduced in "Multiplexing and Channel Coding (FDD)," 3rd Generation Partnership Project, Technical Specification Group Radio Access Network, 3GPP TS 25.212 V4.5.0 (2002-06). The disclosed Blind Transport Format Detection method detects the TFC with ID a blind algorithm.

A Blind Transport Format Detection method must perform three types of TrCHs detection, namely, single, explicit, and guided transport channel format detection. A single transport format detected TrCH has a transport set not containing more than one transport format with more than zero transport blocks and that does not use guided detection. The transport format with more than zero transport blocks must have CRC with non-zero length. Energy detection and a cyclic redundancy check (CRC) are used to blindly detect the transport format transmitted by the single transport format detected TrCH when this TrCH is the only TrCH of the CCTrCH.

Explicit and guided transport format detected TrCHs are non-signaled TrCHs that have more than one transport format and do not use single detection. An explicitly detected TrCH must have at least one block transmitted every Transmission Time Interval (TTI). Each block of an explicitly detected TrCH is appended with a non-zero CRC. Guided detection is used on a TrCH with zero length CRC that is associated with an explicitly detected TrCH. By detecting the transport format of an explicitly detected TrCH, the transport format of the associated guided detected TrCH is also decided.

In order to perform explicit and single detections. CRC is checked for all possible transport format combinations. A valid TFC (transport format combination) is selected if the CRC was valid for all TrCHs in the CCTrCH using this combination. This technique, however, can introduce a misdetection of the TFC, since statistically. CRC checks of all TrCHs may be erroneously valid for a TFC that was not transmitted. A need therefore exists for a Blind Transport Format Detection method that avoids the misdetection problem.

SUMMARY OF THE INVENTION

Generally, methods and apparatus are provided for blind transport format detection using Discontinuous Transmission detection. According to one aspect of the invention, the transport format that was used to transmit information is determined by identifying a transition between a Discontinuous Transmission segment and a data segment included in the transmitted information; and determining the transport format based on a location of the transition of the Discontinuous Transmission segment.

For example, a size of the Discontinuous Transmission segment can used identified and the transport format can be determined based on the size. In a further variation, an energy associated with the data segment relative to energy of a reference segment is determined, and the transport format can be determined based on the energy associated with the data segment.

A cyclic redundancy check can optionally be performed for a plurality of possible transport formats, and then the step of identifying a transition can be limited to those transport formats having a valid cyclic redundancy check. For example, a start of DTX address can be determined for each of the transport formats having a valid cyclic redundancy check.

A more complete understanding of the present invention, as well as further features and advantages of the present invention, will be obtained by reference to the following detailed description and drawings.

BRIEF DESCRIPTION OF THE DRAWINGS

FIG. 2 illustrates pseudo code for an exemplary blind transport format detection process incorporating features of the present invention.

DETAILED DESCRIPTION

Figure 1:
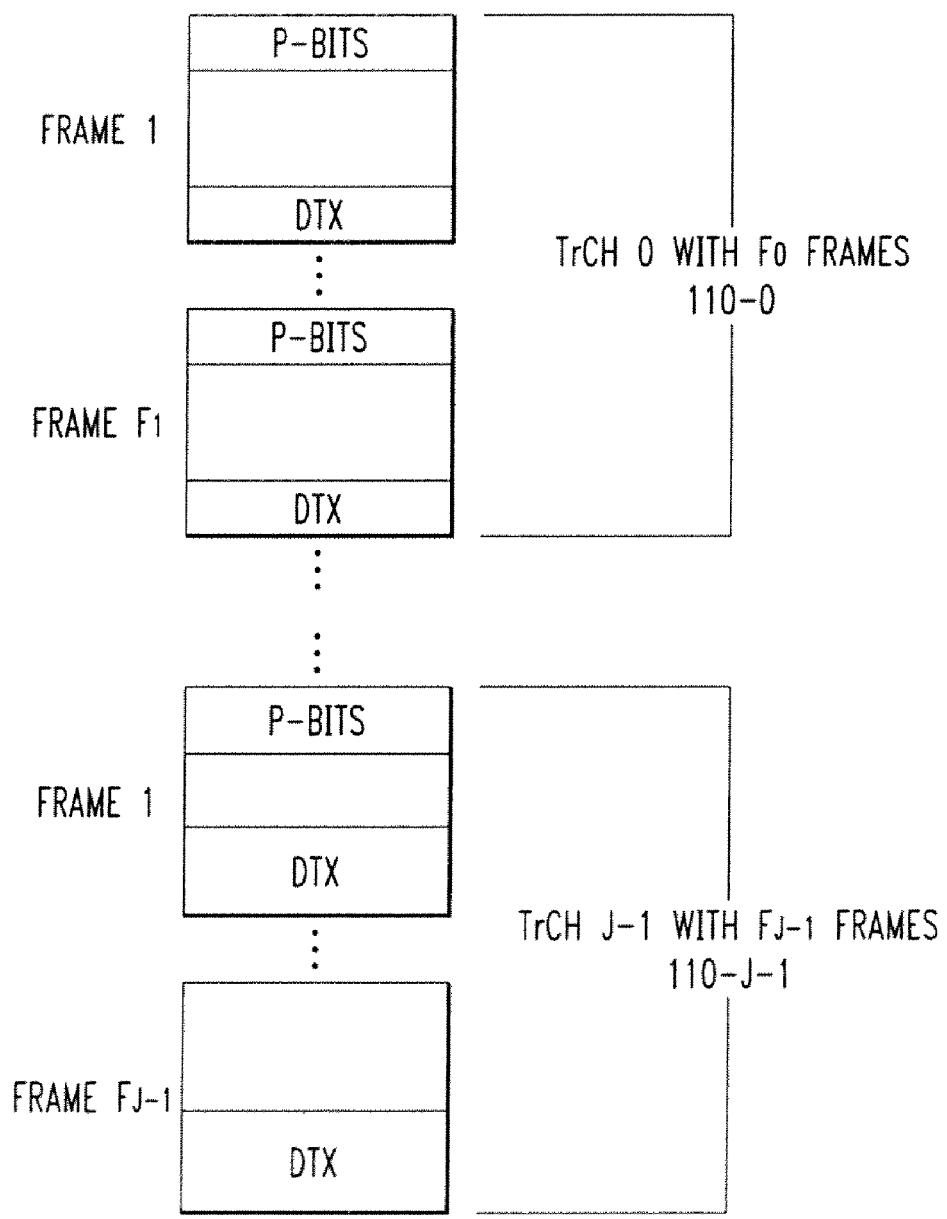
FIG. 1 illustrates an exemplary memory segmentation of a first deinterleaver.

The present invention provides a Blind Transport Format Detection method and apparatus that avoid the misdetection of the TFC by using a Discontinuous Transmission (DTX) detection technique. As used herein, the term "Discontinuous Transmission" or "DTX" shall apply to any temporary situation where the transmitting side transmits at a reduced power level, relative to the transmission of data or payload, for a specific user. Typically, the transmitting side does not transmit any power for a specific user when transmitting the DTX. While there may be there may be different reasons in different systems or under different scenarios to use DTX (e.g., saving power, introducing less interference to other users and reducing the number of transmitted bits), the DTX allows the present invention to determine the transport format, as would be apparent to a person of ordinary skill in the art.

Blind Transport Format Detection Using Path-Metric Values at Surviving Paths

In order to prevent the misdetection of a TFC, an additional operation is required to test the validity of the detection of each of the TrCHs in the CCTrCH. The above-cited 3GPP TS 25.212 V4.5.0 specification suggests using the path-metric values at the surviving paths of the Viterbi decoding of each of the TrCHs. The path-metric value of the zero state and the minimum and maximum values of the remaining states are used to calculate the scatter of the Viterbi decoding in the following manner:

$$S(i) = -10\log\left(\frac{a_0(i) - a_{min}(i)}{a_{max}(i) - a_{min}(i)}\right)[dB]$$

where i is the TFI of detected TrCH; $S(i)$ is the scatter of Viterbi decoding; $\alpha_0()$ is the zero path-metric value; $\alpha_{min}(i)$ is the minimum of remaining path-metric values; and $\alpha_{max}(i)$ is the maximum of remaining path-metric values.

The detection of a transport format is considered valid if the value of $S(i)$ is greater than a predefined threshold, D. Generally, the transport format with the largest scatter is selected from all the TrCHs that pass the CRC check, and are considered valid according to the above method.

This method is applicable as long as access to the path-metric of the Viterbi decoder is available. This, however, is not necessarily guaranteed when integrating a 3G chip, composed of various cores and coprocessors. Also, addition of path-metric access in a Viterbi decoder design, naturally, requires an increase in silicon volume. In addition, this method does not supply a complete solution to the single transport format detected TrCH, in which a zero block transport format is present and does not go through the Viterbi decoding stage.

Blind Transport Format Detection Using DTX Detection

The present invention provides a Blind Transport Format Detection method and apparatus that avoid the misdetection of the TFC by using a DTX detection technique. The present invention provides a method for preventing the misdetection of a TFC by attaining energy related information from an accessible memory component, allowing easy processing of the stored data. In one exemplary implementation, misdetection of a TFC is achieved by attaining energy related information from the first deinterleaver. Since the first deinterleaver is a memory component, it can be accessed, allowing the stored data to be processed. As discussed further below, the energy information allows the transition points from data to DTX to be identified, which allows a one-to-one mapping to the transport format.

FIG. 1 illustrates an exemplary memory segmentation of a first deinterleaver 100. The exemplary memory segmentation of the first deinterleaver 100 may be embodied, for example, as described in the above-cited 3GPP TS 25.212 V4.5.0 specification. As shown in FIG. 1, the first deinterleaver stores a complete TTI of data for each TrCH in a designated, predefined memory segment, such as segment 110-0. When the maximum size transport format is received for a TrCH, its whole designated memory segment 110 in the first deinterleaver 100 is filled (with no DTX). When, however, any other transport format is received, the memory segment is filled with data and DTX padding. The DTX padding is stored at the end of each received frame of the TrCH in the memory segment 110. There is always non-DTX data at the beginning of a frame, as the smallest transport format must have non-zero CRC.

The present invention recognizes that the size of the DTX segment has a one-to-one mapping to the Transport Format (a situation that is defined in the 3GPP specification as a Fixed Position mode). When using compressed mode by puncturing, such as shown in FIG. 1, p-bits replace the first bits of the frame of the TrCH that is to be compressed. The position of amount of the p-bits in fixed position is similar for all possible transport formats of the TrCH.

FIG. 2 illustrates pseudo code for an exemplary blind transport format detection process 200 incorporating features of the present invention. Generally, the blind transport format detection process 200 is implemented when more than one possible transport format combination (TFC) has a valid CRC using the conventional method described above. Thus, the blind transport format detection process 200 shown in FIG. 2 is used to distinguish between two or more transport formats, detected with a valid CRC for a single TrCH.

For each frame in a TTI of the processed TrCH, the blind transport format detection process 200 initially attains the base address, $A_B$, of the frame in the designated TrCH memory segment 110 during step 210. Thereafter, the blind transport format detection process 200 sorts all N transport formats with valid CRCs in descending order during step 220, such that the maximum size TF index equals 0 and the minimum size TF index equals N-1.

For each transport format index, i, with a valid CRC, the blind transport format detection process 200 then attains the start of the DTX address, $A_{DTX}(i)$, during step 230. If p-bits present (for puncturing), update the base address during step 240, as follows:

$A_B = A_B$ + number of p-bits.

The memory is divided into sub-segments during step 250, as follows:

$Seg(0) = A_{DTX}(1) \ldots A_{DTX}(0)$

...

$Seg(N-2) = A_{DTX}(N-1) \ldots A_{DTX}(N-2)$

A reference segment is defined during step 260:

$Seg(ref) = A_B \ldots A_{DTX}(N-1)$

The energy for reference segment is summed during step 270:

$$E_{ref} = \frac{1}{length(Seg(ref))} \sum_{Seg(ref)} soft\_bit^2$$

where p-bits are excluded from the integration if such bits appear in the integration window. As discussed further below in conjunction with FIG. 3, the reference segment is known to be data, and $E_{ref}$ provides a reference for the energy associated with data.

During step 280, the blind transport format detection process 200 searches for non-DTX energy using a threshold, D, as follows:

for $i = 0$ to $N - 2$ $$E = \frac{1}{\text{length}(Seg(i))} \sum_{Seg(i)} \text{soft\_bit}^2 (\text{excluding } p\text{-bits, if present})$$

$n = i$ if $E / E_{ref} > D$, break if $n = N - 2, n = n + 1$ end.

Thus, the energy is computed during step 280 for each segment. As discussed further below in conjunction with FIG. 3, if E(0), for example, is approximately equal to $E_{ref}$, then segment 0 is data. Generally, this process identifies the DTX and data transitions. As previously indicated, identifying the transition point from data to DTX provides a one-to-one mapping to the transport format. The transport format with index n is selected as the transport format during step 290.

If a single transport format detected TrCH is also present in the CCTrCH, its energy shall be calculated per frame over the whole memory segment 110, scaled with the reference segment of the explicitly detected TrCH, and compared to a threshold to decide whether data was transmitted.

Figure 3:
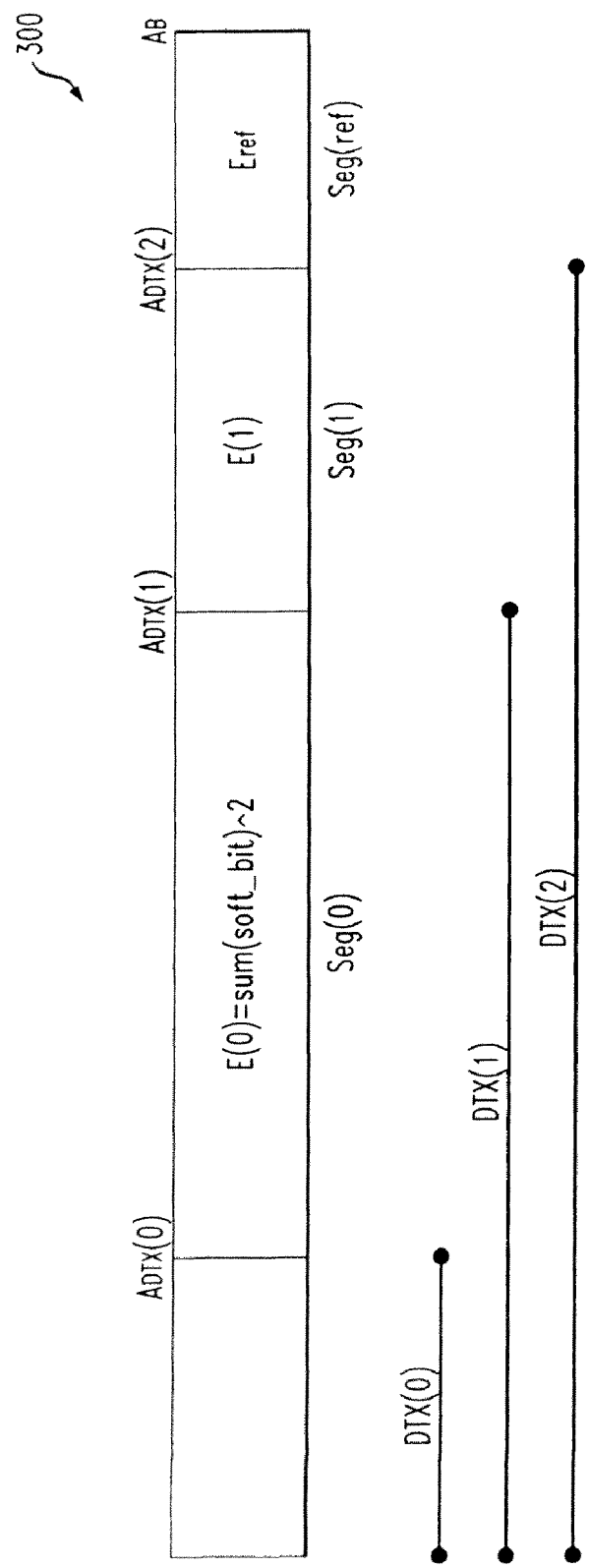
FIG. 3 illustrates the execution of the exemplary blind transport format detection process of FIG. 2 for a memory segment where there are three transport formats with valid CRCs.

FIG. 3 illustrates the execution of the exemplary blind transport format detection process 200 for a memory segment 300 where there are three (N=3) transport formats with valid CRCs. Thus, the blind transport format detection process 200 must determine which of the three potential transport formats with valid CRCs is the correct one. As shown in FIG. 3, $A_{DTX(i)}$, for i between 0 and 2, identifies the location of the start of the DTX field for each of the 3 possible transport formats. As indicated above, the reference segment, Seg(ref), helps to establish a reference for the data energy. The reference segment near the base address $A_B$ of the frame is known to be data. The reference energy is compared to the energy of each potential segment created by the start of the DTX field for each of the 3 possible transport formats. For example, for $A_{DTX}(0)$, the portion of the memory segment 300 between the base address $A_B$ and $A_{DTX}(0)$ (from right to left in FIG. 3), would be data and the remaining portion would be DTX. If E(0) is approximately equal to $E_{ref}$, then transport format i is selected.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. An apparatus for determining a transport format used to transmit information, comprising:
at least one hardware device operative to:
identify a location within a deinterleaver of a transition between a Discontinuous Transmission segment and a data segment included in said transmitted information based on energy related information derived from said deinterleaver; and
determine said transport format by evaluating said identified location of said transition of said Discontinuous Transmission segment.

2. The apparatus of claim 1, wherein said at least one hardware device is further configured to determine a size of said Discontinuous Transmission segment, and said determining said transport format step is based on said size.

3. The apparatus of claim 1, wherein said at least one hardware device is further configured to determine an energy associated with said data segment relative to energy of a reference segment, and said determination is based on said energy associated with said data segment.

4. The apparatus of claim 1, wherein said transmitted information is a transmitted frame.

5. The apparatus of claim 1, wherein said at least one hardware device is further configured to evaluate a cyclic redundancy check for a plurality of possible transport formats, and wherein said identification is only performed for transport formats having a valid cyclic redundancy check.

6. The apparatus of claim 1, wherein said identification is performed for transport formats having a valid cyclic redundancy check and wherein a start of DTX address is determined for each of said transport formats having a valid cyclic redundancy check.

7. The apparatus of claim 1, wherein said at least one hardware device is further configured to update a base address of said information if puncturing is employed.

8. The apparatus of claim 1, wherein said at least one hardware device is one or more of a digital signal processor, a microprocessor, a micro-controller, and a general-purpose computer.

9. The apparatus of claim 1, wherein said apparatus is embodied on an integrated circuit.

10. An apparatus for determining a transport format used to transmit information, comprising:
a processor operative to:
identify a location within a deinterleaver of a transition between a Discontinuous Transmission segment and a data segment included in said transmitted information based on energy related information derived from said deinterleaver; and
determine said transport format by evaluating said identified location of said transition of said Discontinuous Transmission segment.

11. The apparatus of claim 10, wherein said processor is further configured to determine a size of said Discontinuous Transmission segment, and said determining said transport format step is based on said size.

12. The apparatus of claim 10, wherein said processor is further configured to determine an energy associated with said data segment relative to energy of a reference segment, and said determination is based on said energy associated with said data segment.

13. The apparatus of claim 10, wherein said transmitted information is a transmitted frame.

14. The apparatus of claim 10, wherein said processor is further configured to evaluate a cyclic redundancy check for a plurality of possible transport formats, and wherein said identification is only performed for transport formats having a valid cyclic redundancy check.

15. The apparatus of claim 10, wherein said identification is performed for transport formats having a valid cyclic redundancy check and wherein a start of DTX address is determined for each of said transport formats having a valid cyclic redundancy check.

16. The apparatus of claim 10, wherein said processor is further configured to update a base address of said information if puncturing is employed.

17. The apparatus of claim 1, wherein said apparatus is embodied on an integrated circuit.

* * * * *